Figure 1:
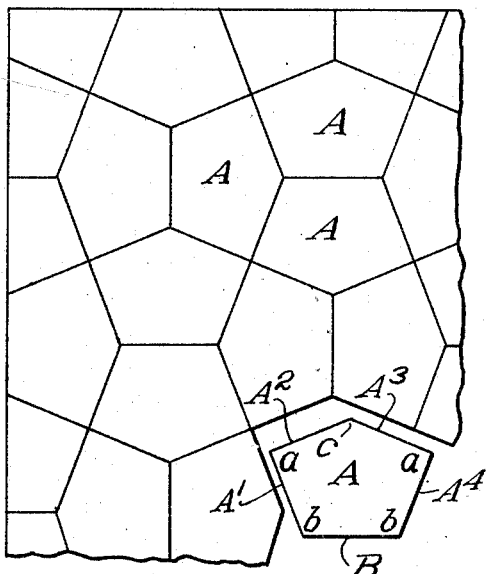

H. C. MOORE.
TILE.
APPLICATION FILED JAN. 20, 1908.

928,320.

Patented July 20, 1909.
2 SHEETS—SHEET 1.

WITNESSES
A. T. Palmer
R. B. Ellis.

INVENTOR
HERBERT C. MOORE
BY Ellis Spear Jr.
ATTY.

H. C. MOORE.
TILE.
APPLICATION FILED JAN. 20, 1908.

928,320.

Patented July 20, 1909.
2 SHEETS—SHEET 2.

WITNESSES
A. T. Palmer
R. B. Ellins

INVENTOR
HERBERT C. MOORE
BY
Ellis Spear Jr.
ATTY.

UNITED STATES PATENT OFFICE.

HERBERT C. MOORE, OF SOMERVILLE, MASSACHUSETTS.

TILE.

No. 928,320.      Specification of Letters Patent.      Patented July 20, 1909.

Application filed January 20, 1908. Serial No. 411,556.

*To all whom it may concern:*

Be it known that I, HERBERT C. MOORE, a citizen of the United States, residing at Somerville, county of Middlesex, Commonwealth of Massachusetts, have invented certain new and useful Improvements in Tiles, of which the following is a specification.

This invention relates to tiling or similar structures in which similar units are laid together to form flooring, wall, or the like. In the production of structures of this sort much difficulty has been experienced in devising units which are capable of combination for the production of a whole which shall conform to the requirements of stability and interengagement incident to the use set forth and at the same time be capable of variation in the general design or pattern of the whole. With the fulfilment of these requirements in view I have devised my present invention by which I have secured a unit capable of interrelation with other similar units in such a manner as to secure strength and stability of structure, mechanical facility of handling and increased possibility of manipulation.

My invention involves the employment of a unit of such proportion and construction as to provide for combination and combinations and, as will be more fully hereinafter described, by the interrelation of relative side and angle values I am able to produce a combination system in which the unit members are uniform, thus affording a great saving in the production of the article, and in the stock of the same required to be kept on hand.

In the specification which follows I have set forth and described, and in the drawings shown, an embodiment of my invention which, for the purposes of disclosure, will be treated as a floor tile.

Throughout specification and drawing like reference letters indicate corresponding parts and in the drawings: Figure 1 is a plan view of my tiling showing one tile detached, Fig. 2 is a modified form of the same, Fig. 3 is a further modification, Fig. 4 shows the adaptation of the form in Fig. 1 to an interlocking tile, Fig. 5 shows a modified form employing curved sides, and Fig. 6, a further curved side modification.

Referring to Figs. 1–4, inclusive, A is a unit formed as a five-sided or pentagonal tile having its sides $A^1$, $A^2$, $A^3$, and $A^4$ equal each to each. The base B may be of unequal length, *i. e.*, it may be longer or shorter than the sides, it only being necessary that $A^2$ corresponds to the side $A^1$ or the side $A^3$ to the side $A^4$. Of the angles $a$ equals $a$ and $b$ equals $b$ and the angle $c$ at the apex is equal to twice the supplement of either angle $b$. The angle $a$ is a right angle. This permits the unit to assemble with other similar units and forms with them a regular, close body made up of uniform units.

Figure 4:
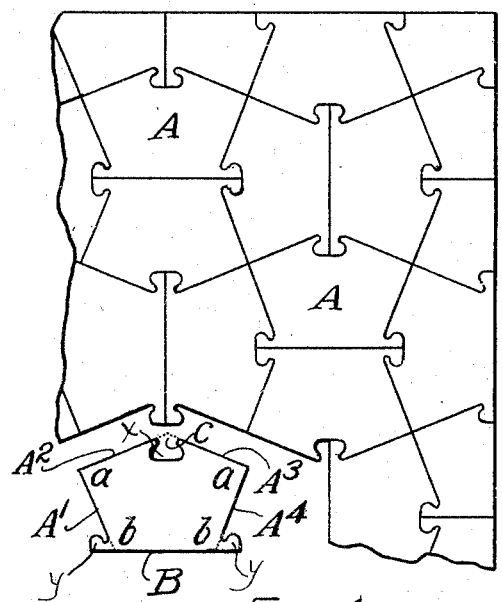
Figure 5:
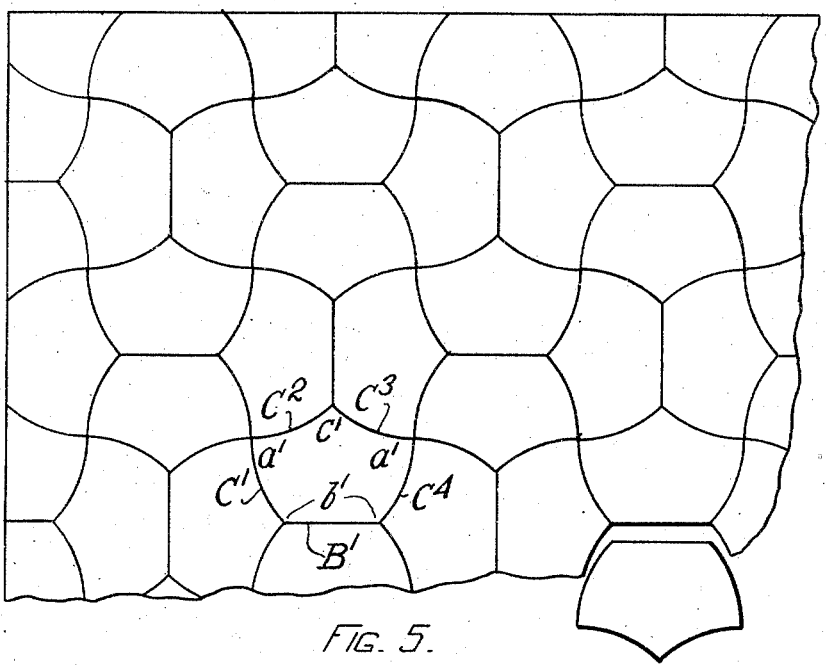

In rubber or composition tiles it is desirable to have the units interlock and I have, therefore, shown in Fig. 4 an adaptation of my invention to this style of tile. The angle values remain the same and the principle is of course identical. I have indicated in dotted lines in this figure the angles on which the said values depend, the tile being the same in plan as Fig. 1, but merely provided with the interlocking recess $x$ at the apex and the ears $y$ at the base of half the area of the recess $y$ and vertically divided.

Figure 2:
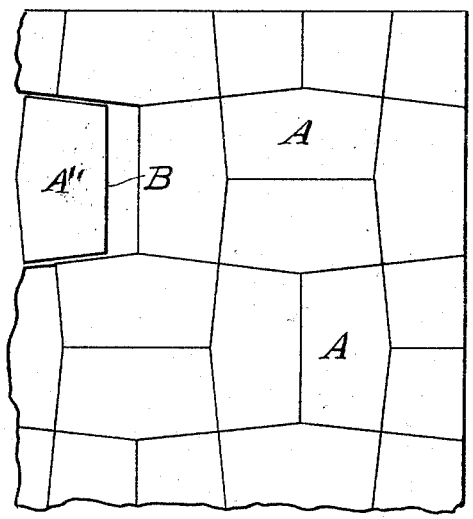
Figure 3:
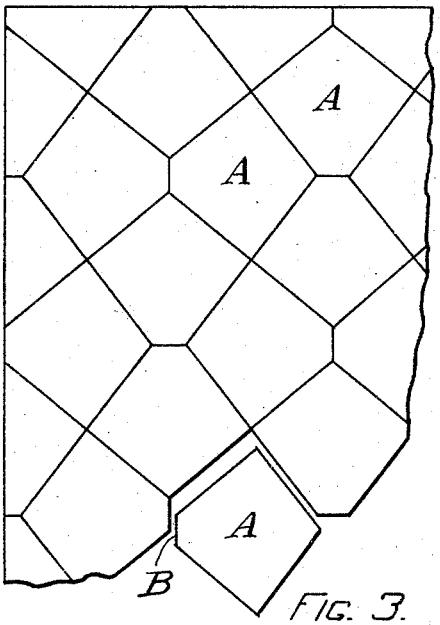

Figs. 2 and 4 illustrate the modifications in form of the unit and the variety of design.

Figure 6:
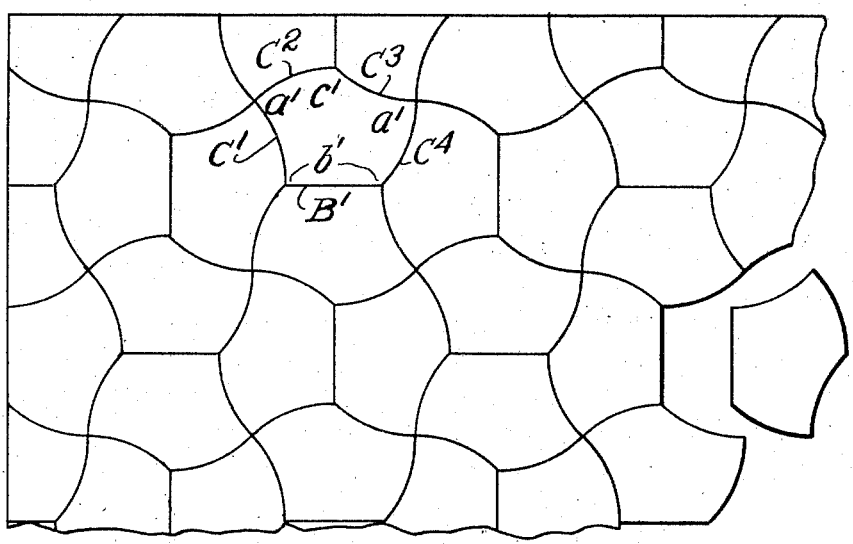

Referring to Figs. 5 and 6, the sides in this case are curved and are lettered $C^1$, $C^2$, $C^3$, and $C^4$, and the base $B^1$. The base angles are lettered $b^1$ $b^1$, the side angles $a^1$ $a^1$ and the apex angle $C^1$. These curvilinear angles have, of course, the same angle values as if they were formed by straight lines, as in Figs. 1 to 4 inclusive. The principle of this form of tile is the same as in those shown in Figs. 1 to 4 and it is only necessary that the curves of the sides $C^1$ and $C^2$ and $C^3$ and $C^4$ be similar, *i. e.*, of the same arc and that they be oppositely disposed so that for instance the side $C^1$ of one unit will correspond and fit closely to the side $C^2$ of an adjacent unit when the said units are assembled on a floor, wall, or other location desired to be covered. This curved sided tile may also obviously be formed as an interlocking unit in a similar manner to the form shown in Fig. 4.

These units may be made of clay, of the tile materials, or rubber composition or like substances, I provide as showing all of the figures half sections of the units to start from, and I preferably finish both sides of my half units so that in the border, as shown, only one half section will be used in the pattern instead of providing rights and lefts; by which means a considerable saving is made in time and material and in the use of rubber tile the item of material is a substantial one.

The units may obviously also be of any color or colors and varied in their manner of combination to produce the various designs and effects desired.

Various other modifications may be made as occasion and desire dictates without departing from the spirit of my invention. My invention is not to be construed, however, as involving other than the use of single pentagonal units for a continuous surface and I hereby expressly disclaim any double pentagonal unit such as might be fashioned after the unit of design shown in the Mosaic floor covering of design patent of E. D. Weary No. 35,949 of June 10, 1902.

What I therefore claim and desire to secure by Letters Patent is:—

1. A continuous surface comprising a plurality of five-sided flat tile units having an apex angle equal to twice the supplement of either of the opposite base angles and having two pairs of sides between said apex and said base, said sides being all equal each to each and each pair of said sides forming an angle equal to a right angle at their point of juncture.

2. A five-sided interlocking tile having a dovetail recess in an apex, and a half dovetail extension on each side of its base on the opposite side, each of said extensions being conformable to one of the symmetrical halves of said recess.

3. In a continuous surface comprising a plurality of five-sided interlocking tiles having a dovetail recess in an apex, and a half dovetail extension on each side of its base on the opposite side, each of said extensions being conformable to one of the symmetrical halves of said recess, a pair of tiles set base to base and a third tile having the said dovetail base extensions of said pair of tiles inclosed in its apex recess.

In testimony whereof, I affix my signature in presence of two witnesses.

HERBERT C. MOORE.

Witnesses:
   ELLIS SPEAR, Jr.,
   R. B. ELLIUS.